A. S. SPEER.

METHOD OF MAKING ROOFING SLABS.

APPLICATION FILED NOV. 23, 1921.

Reissued Nov. 21, 1922. 15,496.

Inventor:
Alexander S. Speer,
By Emery, Booth, Janney & Varney.
Attys.

Reissued Nov. 21, 1922. Re. 15,496

UNITED STATES PATENT OFFICE.

ALEXANDER S. SPEER, OF BUFFALO, NEW YORK, ASSIGNOR TO THE ROOFING PATENTS COMPANY, A CORPORATION OF DELAWARE.

METHOD OF MAKING ROOFING SLABS.

Original application filed April 7, 1919, Serial No. 288,035. Patent No. 1,318,238, dated October 7, 1919. Divided and application filed September 19, 1919, Serial No. 324,952. Original No. 1,379,727, dated May 31, 1921. Application for reissue filed November 23, 1921. Serial No. 517,383.

*To all whom it may concern:*

Be it known that I, ALEXANDER S. SPEER, a citizen of the United States, residing at Buffalo, in the county of Erie and State of New York, have invented an Improvement in Methods of Making Roofing Slabs, of which the following is a specification.

My invention relates to an economical method of making shingle units, or strips, designed when laid in a roof to simulate a plurality of individual shingles.

The invention aims to provide from a sheet of roofing material of well known, or improved, construction which is of much greater length than width a plurality of shingle units, or strips, with a minimum of waste, and each unit of such form that when used to construct a roof in the usual way the end edges of the unit will register with the intact portion of all of the overlying units, or strips, and will not register with the cutout portion thereof, or spaces between the projections which simulate individual shingles.

The invention is illustrated in the accompanying drawings, in which.

Figure 1:
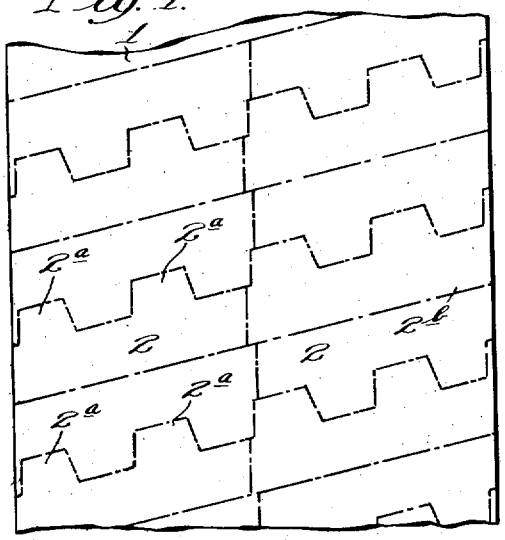
Figure 1 is a plan view of a sheet of roofing material with the lines of cutting for one form of shingle unit illustrated by dotted lines.
Figure 2:
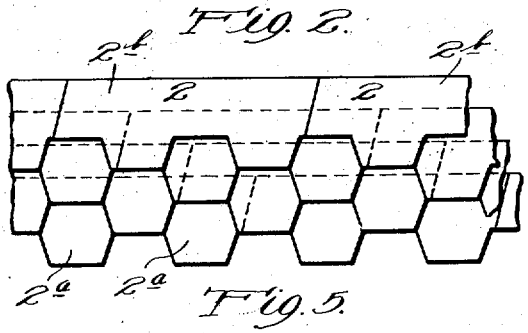
Fig. 2 is a plan view of a section of a roofing formed by the shingle units produced in the manner illustrated in Fig. 1.

A strip of roofing material of well known, or improved construction, and of materially greater length than width is designated 1 in Figs. 1 and 2. From a strip of this character a plurality of shingle units, as will be hereinafter described, are produced. The shingle unit, or strip, is designated 2 in Figs. 1 and 2, and 3 in Figs. 3 and 4, and in each instance it includes a front portion comprising a plurality of projections, or tongues, $2^a$, $3^a$, the projections $2^a$ being of semi-hexagonal shape, with intervening spaces which may be, as shown in Fig. 2, the same size and shape as the tongues, or which may be, as shown in Fig. 4, of considerably less size. Each unit also includes a body portion $2^b$, $3^b$, which is preferably of greater width than the tongue and as shown in Figs. 2 and 4 is approximately twice as wide as the tongue.

In forming a roof the units are laid in horizontal courses with the end edges of the units in each course abutting and with the courses so super-imposed that the projections, or tongues, of each course will be exposed in advance of the tongues, or projections, of the overlying course and with the middle of the spaces between the tongues or projections of the immediate underlying course in register with the middle of the tongues or projections of the immediate overlying course.

As the body portion of each unit is preferably twice as wide as the width of the tongues throughout the major portion of a roof made up of these units, each course has two courses superimposed thereupon, as shown in Figs. 2 and 4.

In prior practice shingle units have been made and have been used in constructing roofs substantially in the manner described and it has been the uniform practice in these articles of the prior art to have the end edges of the body portion of the units disposed substantially perpendicular to the general line of the front edge of the blank, or perpendicular to the line of each horizontal course of blanks as laid in a roof, with the result that portions of the abutting ends of continuous units will register with the spaces between the projections of certain of the overlying units.

For instance, were the end edges of the units, shown in Fig. 1, arranged perpendicular to the general line of the front edge of the unit, or perpendicular to the lines of the courses, portions of the abutting edges of the body portions of the blanks of the lowermost course would be in register with the spaces between the projections of the blanks forming the third course.

My invention aims to insure the covering of the lines of juncture between abutting units by the intact portions of the units or both of the overlying courses, and the manner of accomplishing this object as disclosed herein consists in running the end edges of the body portions of the units at an angle other than a right angle—and as shown herein, at an obtuse angle—to the general direction of the front line of the unit.

For producing a plurality of shingles having the described characteristic from a strip of roofing, such as that designated 1, and with a minimum of waste, I cut the units from the strip with the width of the units disposed substantially lengthwise of the strip, the length of the units being disposed substantially widthwise of the strip. The units are preferably made of such length that a pair of the same will correspond to the width of the strip 1 and the general line of severance forming the front and back of each unit extended other than at right angles or bias to the lengthwise edge of the strip. As shown in Fig. 1, the general line of severance is at such an angle that the edges on one side of the projections $2^a$ are parallel with the lengthwise edges of the strip.

Thus, each lengthwise section of the strip 1 of a width corresponding to the maximum width of the shingle unit is designed to form a blank which, when severed through the middle, will provide two shingle units and this line of severance is along a line parallel to the side edges of the strip 1.

As shown in Fig. 1, the outer or end edges of the body portions of the units will be formed by the lengthwise edges of the strip 1 and due to the angle of the general line of severance forming the lengthwise edges of the blank the end edges thereof formed by the lengthwise edges of the strip 1, as well as the edges formed by severing the blank through the middle, will be disposed at the desired angle to the general line of the lengthwise edges of the blanks.

Figure 3:
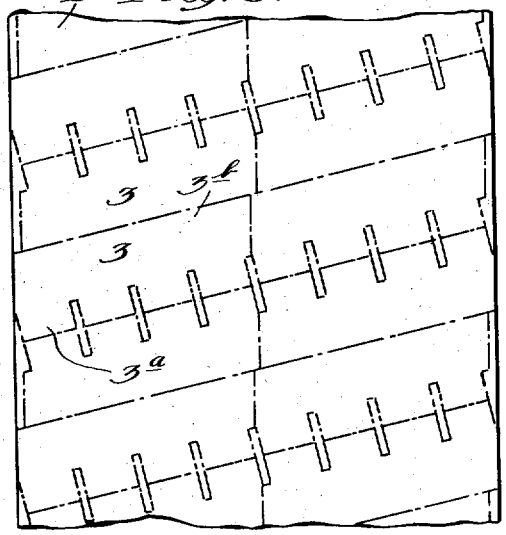
Fig. 3 is a view similar to Fig. 1, showing in dotted lines the lines of severance for producing a different form of shingle unit, and, Fig. 4 is a section of a roof formed by shingle units of the character produced in the manner indicated in Fig. 3.
Figure 4:
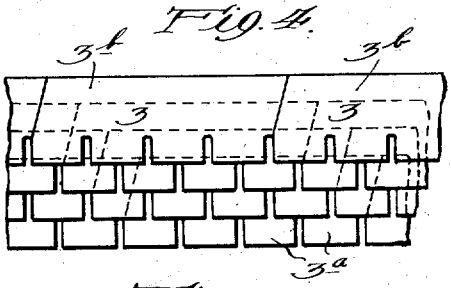

In the exemplification of the invention shown in Fig. 3 the same general plan for severing the units from the strip 1 is followed, but there is slightly more waste than in the plan illustrated in Fig. 1, due to the difference in the shape of the projections, or tongues, provided on the units.

Figure 5:
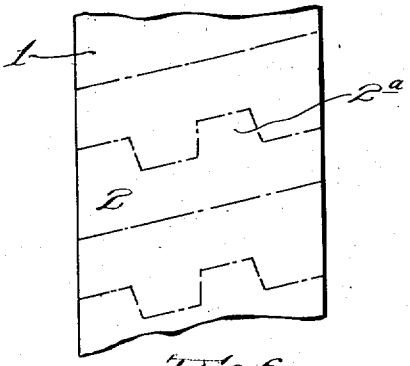
Figs. 5, 6 and 7 illustrate that the method can be carried out in connection with a strip of a width only sufficient to cut one slab crosswise thereof.
Figure 7:
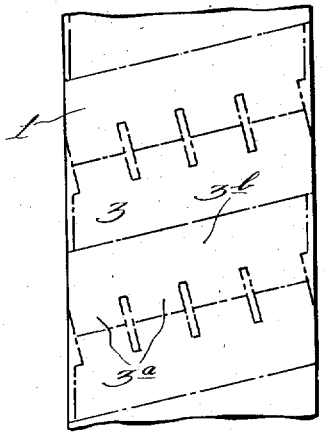
Figure 6:
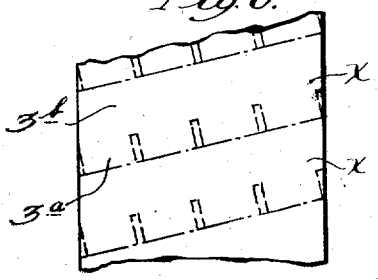

Figs. 5, 6 and 7 show a strip narrower than that of Figs. 1 and 3 to provide material across its width for only one slab. In Fig. 5, the outer edge of the extreme projection $2^a$ coincides with one of the edges of the strip.

The present case is based on subject matter divided out from application filed by me April 7, 1919, #288,035.

It will be seen that the method is so performed that a shoulder is left at $x$ which will provide for the overlapping of the slab above it, and a nail which may be inserted adjacent this shoulder will be protected. In the form of the method as carried out according to Figs. 1 and 3, it will be noticed that the central longitudinal line of severance is staggered and the shouldered construction results from this.

I claim—

1. The method of producing from a prepared roofing strip of materially greater length than width a plurality of units each having along one edge a plurality of projections and spaces consisting in severing said strip in widthwise sections to form a plurality of blanks of the length of two units, the general direction of severance of said blanks being along lines at other than a right angle to the lengthwise edges of the strip and severing the blanks through the middle thereof along a line parallel to the side edges of the strip.

2. The method of producing a plurality of shingle units each having a plurality of spaced apart projections along the front edge thereto for simulating a plurality of individual shingles when the unit is used in a roof and a body portion having transverse edges disposed at other than a right angle to the general line of said front edge, consisting in providing a strip of composition roofing of materially greater length than width, cutting the same transversely along a line to provide said projections and along a line parallel to the general direction of the first named line and spaced apart therefrom, and cutting the section so formed through its middle on a line parallel with the lengthwise edges of the strip, the general direction of said first named lines of severance being at an obtuse angle to the lengthwise edges of the strip.

3. The method of producing roofing slabs from a prepared strip or roofing material of materially greater length than width, which consists in severing said strip in widthwise sections along a line to produce projections and intervening spaces to form one edge of the slab and severing along a substantial straight line to form the other edge, the general direction of severance of said sections along both lines being at other than a right angle to the lengthwise edges of the strip, substantially as described.

4. The method of producing a plurality of shingle units each having a plurality of spaced apart projections along the front edge thereto for simulating a plurality of individual shingles when the unit is used in a roof and a body portion having transverse edges disposed at other than a right angle to the general line of said front edge, consisting in providing a strip of composition roofing of materially greater length than width, cutting the same transversely along a line to provide said projections and along a line parallel to the general direction of the first named line and spaced apart therefrom, and cutting the section so formed through its middle on a line parallel with the lengthwise edges of the strip, the general direction of said first named lines of severance being at an obtuse angle to the lengthwise edges of the strip, the middle line of severance being staggered, substantially as described.

5. The herein described method of making roofing slabs consisting in providing a strip of composite roofing material of materially greater length than width, cutting the said strip transversely along a line to provide one edge of the slab with projections and intervening spaces and a shoulder at one end and cutting the strip along another line to form the other edge of the slab, the general direction of said cuts being at an inclination to the side edges of the strip, substantially as described.

6. The method of making from sheet roofing material a shingle unit having along one edge a plurality of spaced semi-hexagonal projections, which comprises severing said units from a sheet of material in complementary pairs diagonally of the sheet, the projection of one unit formed of material corresponding to the recess of the adjacent unit and vice versa.

7. The method of making from sheet roofing material, shingle units having shingle projections of semi-hexagonal shape, which comprises severing the units from said sheet on the bias so that one side of a tab substantially coincides with one side edge of the sheet.

8. The method of making from flexible non-metallic sheet roofing material, shingle units having a plurality of spaced shingle projections, which comprises severing said sheet on the bias along a line having the contour of one edge of said unit whereby to provide a unit, the ends of which are inclined to the general direction of the severed edge of said unit.

9. The method of making shingle units having spaced shingle projections along the edge thereof for simulating a plurality of individual shingles when laid end to end on a roof in overlapping courses, which consists in providing a sheet of composition roofing material of materially greater length than width, cutting the same diagonally at intervals along lines to provide the shingle projections and to provide said units with ends inclined to the general direction of the front edge thereof, whereby when said units are laid in courses the lines of juncture between adjacent units are inclined in the general direction of the course.

10. The method of making shingle units having spaced shingle projections of semi-hexagonal shape along the edges thereof for simulating a plurality of individual hexagonal shingles when laid end to end on a roof in overlapping courses, which consist in providing a sheet of composition roofing material of materially greater length than width, cutting the same diagonally at intervals along lines to provide the shingle projections, the general angle of inclination of the line along which said sheet is severed being such that one side of the shingle projections is parallel to the side edge of said sheet.

11. The method of making roofing units which simulate a plurality of spaced shingle tabs when the units are laid end to end, which comprises providing a strip of composite roofing of considerable length relative to its width, cutting the strip transversely along a line to provide a plurality of alternate tabs and spaces when said units are laid end to end, cutting said strip along another line to form the other longitudinal edge of the unit, the general direction of said cuts being inclined to the end edges of the unit, and repeating said cutting at intervals along said strip.

12. The method of making from sheet roofing material shingle units having shingle projections, the side edges of which converge, which comprises severing the units from said sheet on the bias so that one side of a shingle projection lies substantially parallel with one side edge of the sheet.

ALEXANDER S. SPEER.